United States Patent [19]
Miyazaki et al.

[11] Patent Number: 5,810,634
[45] Date of Patent: *Sep. 22, 1998

[54] METHOD OF MANUFACTURING A PLASMA ADDRESSED LIQUID CRYSTAL DISPLAY DEVICE

[75] Inventors: Shigeki Miyazaki; Takahiro Togawa, both of Kanagawa, Japan

[73] Assignee: Sony Corporation, Tokyo, Japan

[ * ] Notice: The term of this patent shall not extend beyond the expiration date of Pat. No. 5,526,151.

[21] Appl. No.: 658,598

[22] Filed: Jun. 5, 1996

Related U.S. Application Data

[63] Continuation-in-part of Ser. No. 434,863, May 4, 1995, Pat. No. 5,526,151.

[30] Foreign Application Priority Data

Sep. 27, 1994 [JP] Japan ................................. 6-257617

[51] Int. Cl.⁶ ........................................... H01J 9/26
[52] U.S. Cl. ................... 445/25; 445/24; 349/33
[58] Field of Search ................ 445/24; 349/25, 349/33; 427/66

[56] References Cited

U.S. PATENT DOCUMENTS

| | | | |
|---|---|---|---|
| 4,235,001 | 11/1980 | Matino | 445/24 |
| 5,244,427 | 9/1993 | Umeya | 445/24 |
| 5,526,151 | 6/1996 | Miyazaki et al. | 359/87 |

*Primary Examiner*—P. Austin Bradley
*Assistant Examiner*—Jeffrey T. Knapp
*Attorney, Agent, or Firm*—Hill & Simpson

[57] ABSTRACT

A plasma addressed liquid crystal display device having a plasma cell and a liquid crystal cell stacked one above the other is manufactured by a method of forming stripe-shaped barrier ribs by printing to a substrate on which a plurality of plasma electrodes are previously formed, filling a temporary reinforcing material between each of the stripe-shaped barrier ribs to bury the periphery of the individual barrier ribs, polishing to planarize a top portion of each of the barrier ribs buried in the reinforcing material, removing the temporary reinforcing material to expose the plasma electrodes and finally joining a dielectric sheet in contact with the planarized top portions of the barrier ribs, to assemble a plasma cell. Barrier ribs formed in the plasma cell of the plasma addressed liquid crystal display device can be polished stably with no worry of destruction.

11 Claims, 9 Drawing Sheets

METHOD OF MANUFACTURING A PLASMA ADDRESSED LIQUID CRYSTAL DISPLAY DEVICE

CROSS-REFERENCE TO RELATED APPLICATION

This application is a Continuation-In-Part Application of application Ser. No. 08/434,863, filed May 4, 1995, now U.S. Pat. No. 5,526,151.

BACKGROUND OF THE INVENTION

1. Field of the Invention

The present invention relates to a plasma addressed liquid crystal display device having a plasma cell and a liquid crystal cell stacked one above the other by way of a dielectric sheet. More specifically, it relates to a method of manufacturing a plasma cell by using a screen printing process.

2. Description of the Related Art

Figure 7:
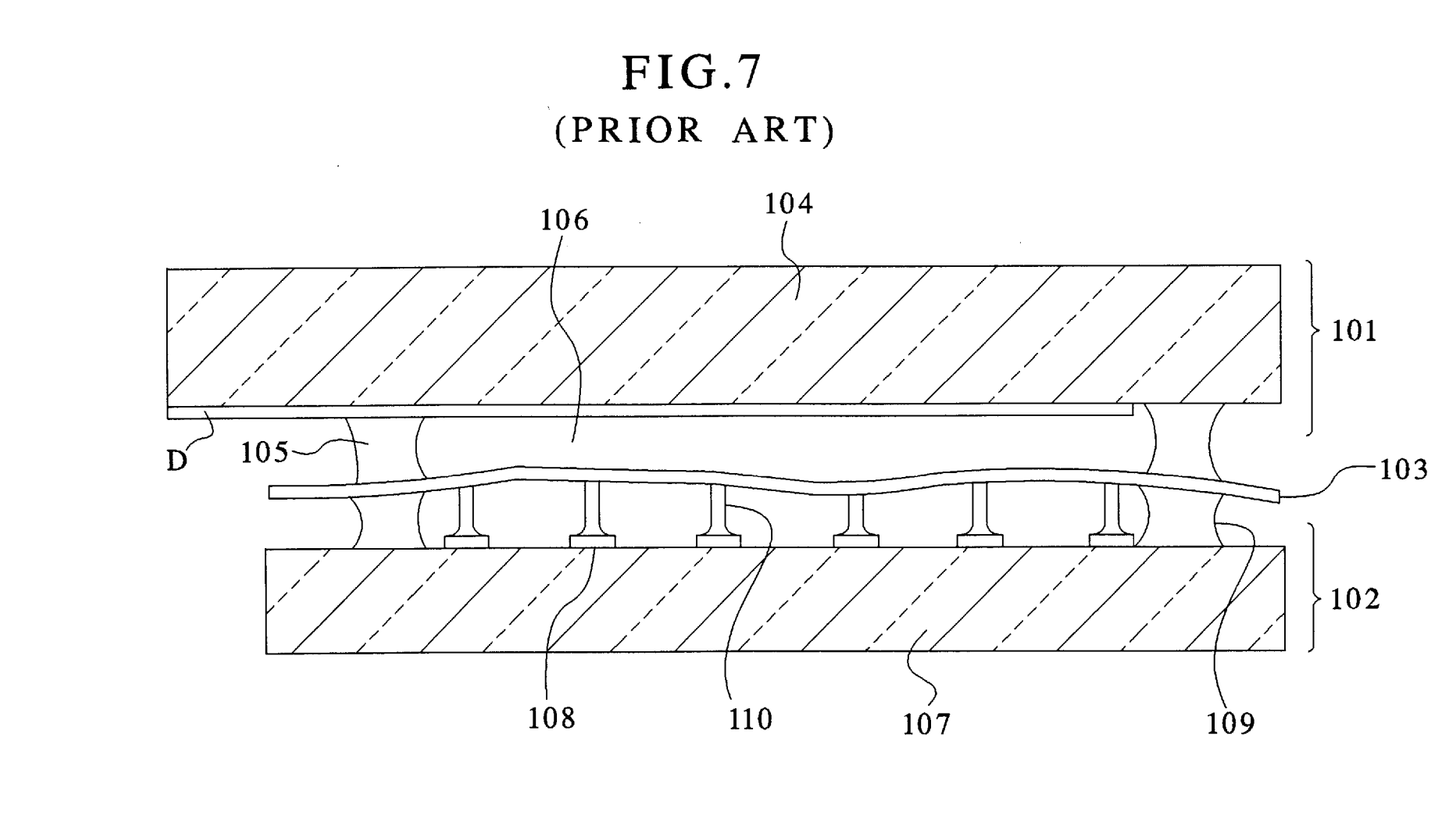
FIG. 7 is a cross sectional view illustrating a plasma addressed liquid crystal display device of the prior art.

A plasma addressed liquid crystal display device will be explained briefly with reference to FIG. 7. The plasma addressed liquid crystal display device is disclosed, for example, in Japanese Laid-Open Patent Hei 4-265931. As illustrated in the figure in the reference, the plasma addressed liquid crystal display device has a structure comprising a lamination of a liquid crystal cell 101, a plasma cell 102 and a dielectric sheet 103 interposed between them. It is necessary that the dielectric sheet 103 is as thin as possible for driving the liquid crystal cell 101, and an extremely thin plate glass with a thickness of about 50 $\mu$m is used. The liquid crystal cell 101 includes an upper glass substrate 104 and signal electrodes D are formed in a stripe pattern on the main inner surface of the substrate. The substrate 104 is bonded to the dielectric sheet 103 with a predetermined gap therebetween using spacers 105. A liquid crystal layer 106 is filled in the gap. The gap has a size of usually of about 5 $\mu$m, which has to be kept uniform over the entire display surface.

The plasma cell 102 portion of the display includes a lower glass substrate 107. A plurality of plasma electrodes 108 are formed in a stripe pattern on the main surface of the glass substrate 107. The glass substrate 107 is joined by way of a frit seal member 109 to the dielectric sheet 103 to define a space between the substrate and the sheet. An ionizable gas is sealed in the space that is sealed by the frit seal member 109. A barrier rib 110 is formed on each of the plasma electrodes 108 by means of a screen printing process. The plasma cell 102 is divided by the barrier ribs 110 into stripe portions that constitute electric discharge channels. The screen printing process is a simple technique capable of forming a fine pattern and of remarkably improving the productivity and the working efficiency in the manufacturing process.

Although the barrier ribs 110 are formed by screen printing, they are required to be of a considerable thickness since they function as a gap spacer for the plasma cell 102. However, the height of the barrier ribs 110 varies, and the top portion of individual barrier ribs may be uneven due to, for example, screen mesh residue. Accordingly, when the top portion of the barrier ribs 110 and the dielectric sheet 103 which is made of extremely thin plate glass are in contact with each other, undulations are caused to the surface of the dielectric sheet so that the flatness of the dielectric sheet can not be maintained. As a result, the thickness of the liquid crystal layer 106 on the side of the liquid crystal cell 101 can not be controlled to be uniform, which causes a markedly deteriorated display quality. In addition, the gap distance between the lower glass substrate 107 and the dielectric sheet 103 also varies, which results in a failure to obtain uniform plasma discharges.

In view of the above, a countermeasure has been adopted of first printing and baking the barrier rib 110 to produce a rib of a somewhat larger thickness (height) than required and then subsequently planarizing the tops of the ribs by polishing. However, each of the barrier ribs 110 usually has a width of about 100 $\mu$m and a height of 100 to 300 $\mu$m. Since the height is greater than the width, the mechanical strength of the rib is weak and, particularly, the end of the barrier rib is fragile. Therefore, when polishing is carried out for planarization of the top portion of the ribs after the printing and baking steps, there is a problem that the barrier ribs are broken or destroyed by the effects of the mechanism stresses during polishing.

SUMMARY OF THE INVENTION

It is an object of the present invention, in view of the foregoing technical problems, to provide a method of manufacturing a plasma addressed liquid crystal display device capable of applying a stable polishing treatment to top portions of the barrier ribs.

The foregoing object and other objects are attained in accordance with the present invention. Namely, a plasma addressed liquid crystal display device comprising a plasma cell and a liquid crystal cell stacked one above the other by way of a dielectric sheet is manufactured by the following steps. At first, a step of forming barrier ribs is performed by printing the ribs in a stripe pattern on a substrate on which plasma electrodes have been previously formed. Then, a temporary reinforcing step is performed by filling a temporary reinforcing material between each of the stripe-shaped barrier ribs to bury the periphery of individual barrier ribs. Thereafter, a polishing step is performed for planarizing the top portion for each of the barrier ribs by polishing the tops of the ribs while the ribs are in a buried state. Further, a removing step is performed by removing the temporary reinforcing material to expose the plasma electrodes. Finally, a joining step is performed by joining a dielectric sheet in contact with the planarized top portion of each of the barrier ribs to assemble the plasma cell. Subsequently, the liquid crystal cell is assembled by being stacked on the plasma cell to complete a plasma addressed liquid crystal display device.

More specifically, in the temporary reinforcing step, the temporary reinforcing material may be formed by supplying a UV-ray curable resin to a substrate and then applying a curing treatment. Further, in the removing step, the temporary reinforcing material comprising the UV-ray curable resin may be dissolved in a warm water under stirring. Preferably, in the temporary reinforcing step, the temporary reinforcing material is filled in such an amount corresponding to greater than one-half the height of the printed barrier rib and at a level corresponding to less than the amount of polishing to be performed to the top portion of the barrier rib. In other words, the temporary reinforcing material is at a lower level than the final polished height of the ribs. An alternate embodiment is also provided wherein the reinforcing material is filled to a greater depth including up to or above the top surfaces of the ribs. Depending on the case, a thermosetting resin such as a water soluble polyethylene glycol can be used instead of the water soluble UV-ray curable resin as the temporary reinforcing material.

According to the present invention, after screen printing the barrier ribs in a stripe pattern and baking them, the temporary reinforcing material is filled before the polishing treatment to bury the periphery of the barrier ribs. This can reinforce the barrier ribs which are of a relatively low mechanical strength, so that they can sufficiently withstand mechanical stresses applied during polishing. Thus, high quality plasma cells can be manufactured at a good yield. After the polishing step, the temporary reinforcing material is removed to expose the plasma electrodes. A UV-ray curable resin is suitable as the temporary reinforcing material. Since, different from thermosetting resins, it suffers from no substantial deformation upon curing treatment and there is no worry of injuring the barrier ribs.

If a water soluble UV curable resin is used, since it can be easily dissolved and removed in warm water by stirring, it has no undesired effect on the underlying plasma electrodes. Further, a water soluble polyethylene glycol is also suitable to the temporary reinforcing material, which makes the handling more convenient as compared with the case of using the UV-ray curable resin. If the water soluble reinforcing material is used the polishing step is performed without water, such as using an oil coolant/lubricant. Conversely, if an ail soluble reinforcing material is used, the polishing step should be performed without using oil, such as by using a water lubricant/coolant.

DETAILED DESCRIPTION OF THE PREFERRED EMBODIMENTS

Figure 1A:
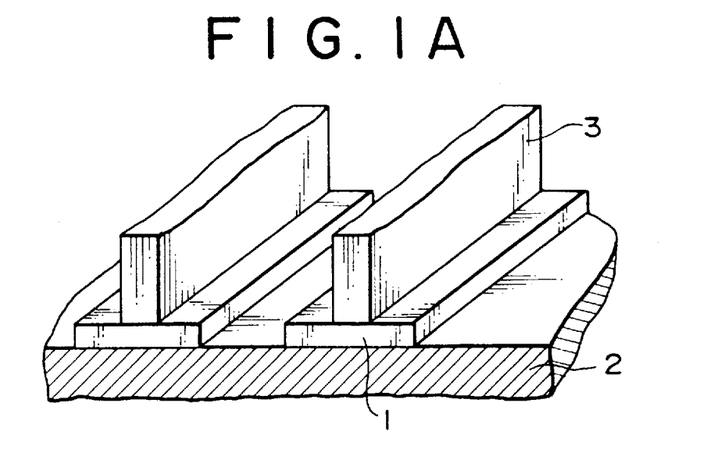
FIG. 1A is a perspective view and FIGS. 1B–1D are cross sections showing basic steps illustrating a method of manufacturing a plasma addressed liquid crystal display device according to the present invention.
Figure 1B:
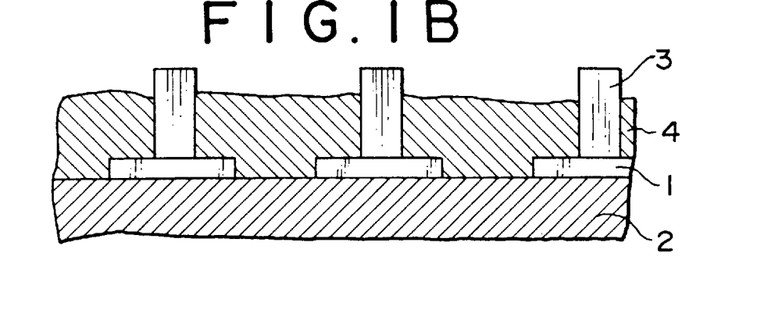
Figure 1C:
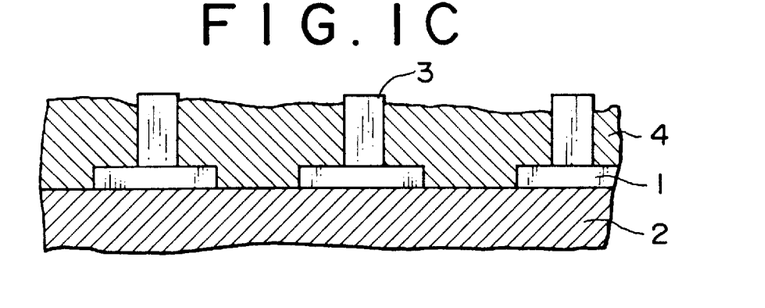
Figure 1D:
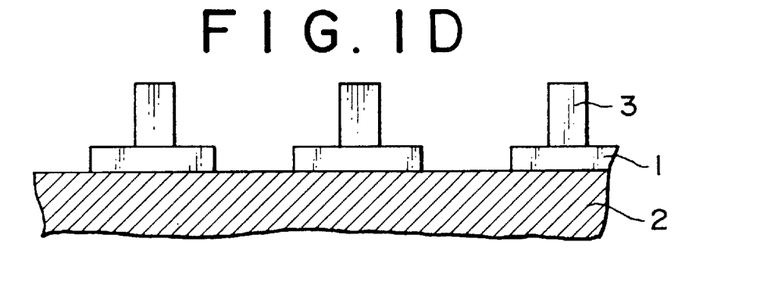

Description will be made specifically to preferred embodiments according to the present invention with reference to the drawings. FIGS. 1A to 1D are schematic views illustrating principal steps for a method of manufacturing a plasma addressed liquid crystal display device according to the present invention. At first, a barrier rib forming step illustrated in FIG. 1A is applied. That is, stripe-shaped barrier ribs 3 are formed by a printing step on a substrate 2 having previously formed plasma electrodes 1. For obtaining a desired height, printing is applied by wet-on-wet coating. However, the height for the individual barrier ribs 3 varies to some extent and a trace of the screen mesh used for printing is left on the top portion of the barrier rib which causes unevenness. Then, a temporary reinforcing step shown in FIG. 1B is applied; in this step, a temporary reinforcing material 4 is filled between each of the stripe-shaped barrier ribs to bury the periphery of the individual barrier ribs 3. Preferably, the amount of the reinforcing material 4 to be filled is determined to such an amount as to be greater than one-half the height of the printed barrier rib 3 and at such a level as to be less than the level of polishing of the top portion of the barrier rib 3. If the amount of the temporary reinforcing material 4 is less than one-half height of the barrier rib 3, no adequate mechanical strength can be obtained to alleviate the problem that the barrier rib 3 could be destroyed by polishing in the subsequent step. Further, if in this embodiment, the provisional reinforcing material 4 is filled to a level higher than the polishing amount, it may also cause an undesired effect on the polishing treatment in the subsequent step. If the surface height of the temporary reinforcing material is predetermined in accordance with the amount of polishing, the end point for the polishing treatment can substantially be detected automatically. In this embodiment, a UV-ray curable resin is used for the temporary reinforcing material 4. Since no heating treatment is required for curing of the resin, the filled temporary reinforcing material undergoes no volume change and, thus, no undesired mechanical stresses are exerted on the barrier ribs 3. Then, a polishing step as shown in FIG. 1C is applied to planarize the top portion of each of the barrier ribs 3 by polishing. At the same time, the height for each of the individual barrier ribs 3 can also be unified. Finally, the removing step as shown in FIG. 1D is performed. Namely, the temporary reinforcing material is removed to expose the underlying plasma electrodes 1. In this case, removal can be conducted extremely easily if a water soluble UV-ray curable resin is used as the temporary reinforcing material. For instance, the UV-ray curable resin is dissolved and can be peeled off extremely easily by dipping the substrate into warm water and stirring. By using this method, there is no requirement for particular consideration of the chemical resistance of the plasma electrode or barrier ribs. Subsequently, a joining step is performed by joining the dielectric sheet in contact with the planarized top portion of the barrier ribs to assemble the plasma cell.

Further, a liquid crystal cell is assembled on the plasma cell to complete a plasma addressed liquid crystal display device.

Figure 2:
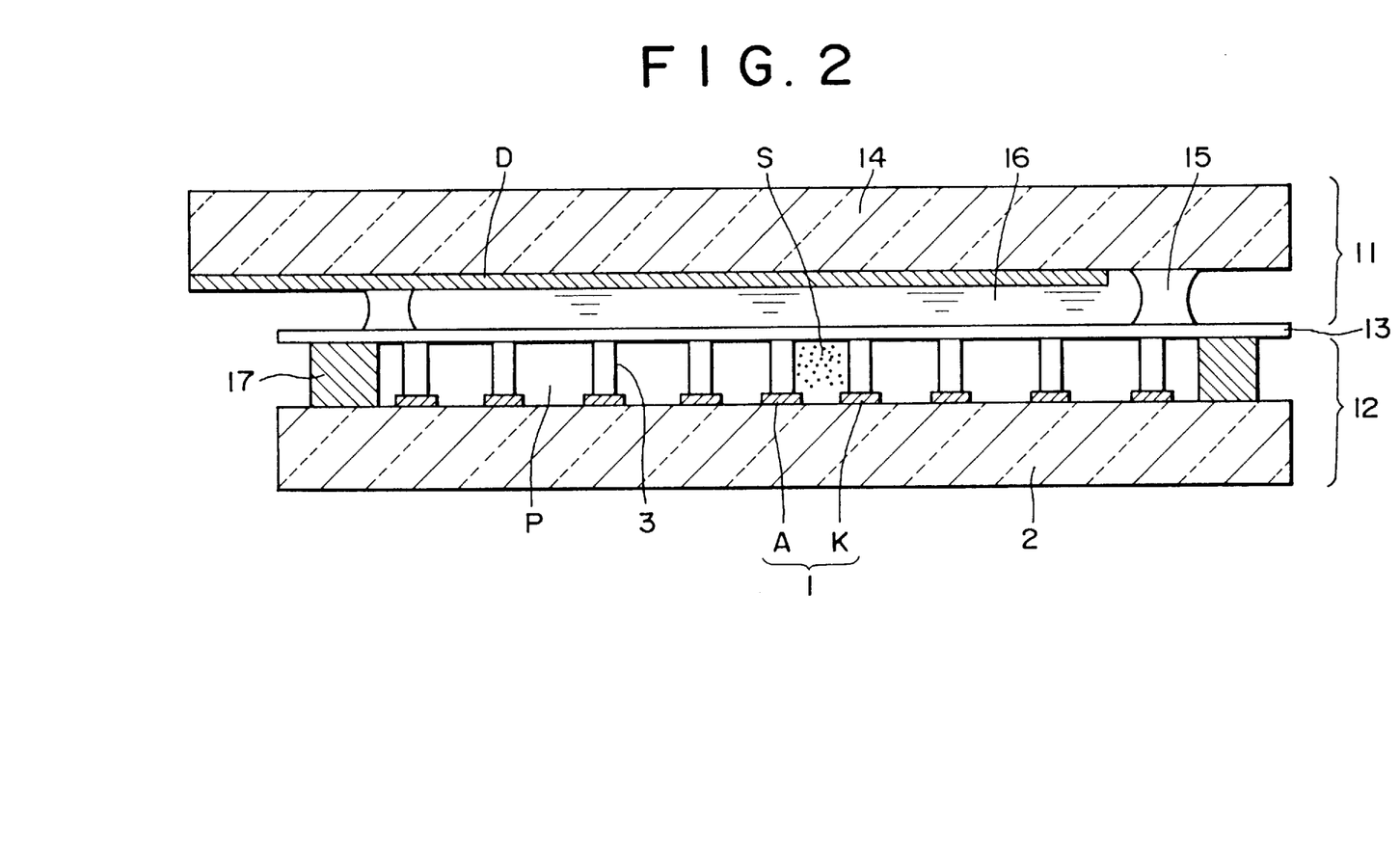
FIG. 2 is a schematic cross sectional view illustrating a plasma addressed liquid crystal display device in a complete state manufactured in accordance with the present invention.

FIG. 2 is a schematic cross sectional view illustrating a plasma addressed liquid crystal display device in a complete state manufactured as described above. In the completed state as illustrated, the plasma addressed liquid crystal display device is formed as a flat panel comprising a lamination of a liquid crystal cell 11, a plasma cell 12 and a dielectric sheet 13 interposed between both of them. It is necessary that the dielectric sheet 13 is as thin as possible for driving the liquid crystal cell and, for example, an extremely thin plate glass of about 50 $\mu$m thickness is used. The liquid crystal cell 11 includes a glass substrate 14, and a plurality of signal electrodes D are formed along the direction of rows on the inner main surface thereof in parallel with each other. The glass substrate 14 is bonded at a predetermined gap to the dielectric sheet 13 using spacers 15. A liquid crystal layer 16 is filled in the gap. The size of the gap is usually about 5 μm and it has to be kept uniform over the entire display surface. For this purpose, spacer particles having a predetermined grain size are usually scattered in the gap, although these are not illustrated here. Further, since the dielectric sheet 13 is supported by the barrier ribs 3 that have been planarized at the top surface and made uniform in height by the polishing treatment, the surface of the sheet is highly planarized. Thus, the size of the gap for the liquid crystal cell 11 can be controlled within an allowance of about ±0.1 μm.

On the other hand, the plasma cell 12 includes the substrate 2 described above. Plasma electrodes 1 are formed on the inner main surface of the sub-state 2. The plasma electrodes 1 function alternately as anodes A and cathodes K to generate a plasma discharge. Since the temporary reinforcing material has been eliminated completely from the surface for each of the plasma electrodes 1, there is no worry that it will have an undesired effect on electric discharge. The barrier ribs 3 are formed on the plasma electrodes 1. As described previously, the top portion of the barrier rib 3 is planarized by the polishing treatment and is in contact with the dielectric sheet 13 to control the size of the gap between the plasma cell 12 and the liquid crystal cell 11 so that it is uniform. A frit seal material 17 made of low melting glass or the like is disposed along the periphery of the substrate 2 to the outside of the barrier ribs 3, to join the dielectric sheet 13 and the substrate 2. A gas-tightly sealed discharging channel P is formed between both of them. An ionizable gas is sealed at the inside of the discharging channel p. Species of the gas can be selected, for example, from helium, neon, argon, xenon or a mixture thereof. When a predetermined voltage is applied between a pair of the adjacent plasma electrodes 1, that is, between the anode A and the cathode K, the sealed gas is selectively ionized to form a discharge region S in which the ionized gas is localized. The discharge region S is substantially defined with the barrier ribs 3 to constitute a column scanning unit. An individual picture element is positioned at an intersection between the discharge channel P and the signal electrode D. In this embodiment, the barrier rib 3 is disposed being aligned on the plasma electrode 1 but the present invention is not restricted only thereto. For instance, a pair of plasma electrodes that function as the anode A and the cathode K may be disposed between a pair of barrier ribs that are adjacent each other. Depending on the case, the plasma electrodes 1 and the barrier ribs 3 may be disposed in the directions perpendicular to each other to constitute a so-called open cell structure.

Description will be made specifically to an actual embodiment for a method of manufacturing a plasma addressed liquid crystal display device according to the present invention, by way of a flow chart shown in FIG. 3 also with reference to FIG. 4 to FIG. 6. At first, printing for the plasma electrodes is performed at step S1. For instance, a nickel paste or the like is coated by a screen printing process. Then, the barrier ribs are printed at step S2. A desired height of the barrier rib is, obtained by using the screen printing process and coating using a glass paste or the like repeatedly by wet-on-wet coating. It is preferable to set the height to which the barrier ribs are to be printed while taking the amount of polishing into a consideration. Then, the printed plasma electrodes and the barrier ribs are baked simultaneously in accordance with a predetermined temperature profile at step S3.

Figure 4:
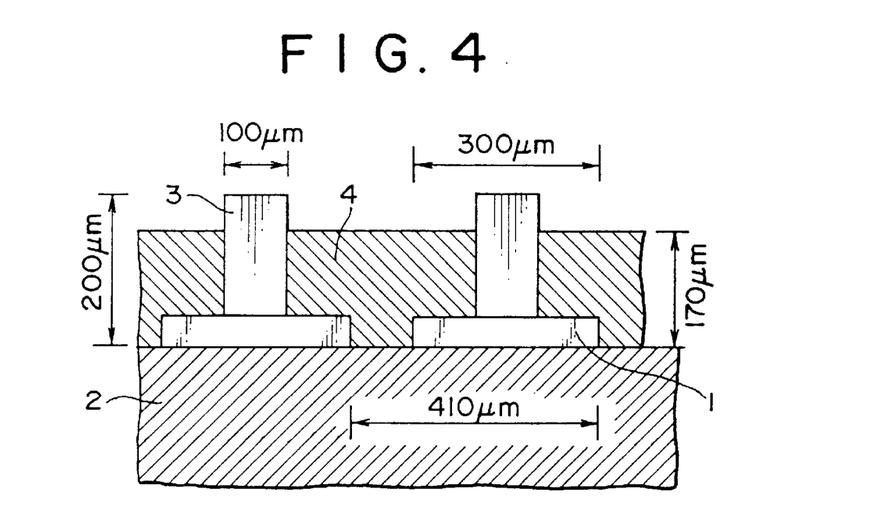
FIG. 4 is an explanatory cross sectional view illustrating the actual size for the barrier rib and the plasma electrode.

FIG. 4 shows the size of the plasma electrode and the barrier rib in the direction of the height and the width formed in this step. In this embodiment, the plasma electrode has a width of 300 μm and is arranged in a stripe pattern at a pitch of 410 μm. On the other hand, the barrier rib 3 has a width of 100 μm and a height of 200 μm from the surface of the substrate 2 to the top. As described above, since the barrier rib 3 has a height greater than its width and is in the form of a wall, and the mechanical strength is, therefore, not so great, if the polishing treatment is applied as it is, it may cause breakage or destruction of the rib.

Figure 3:
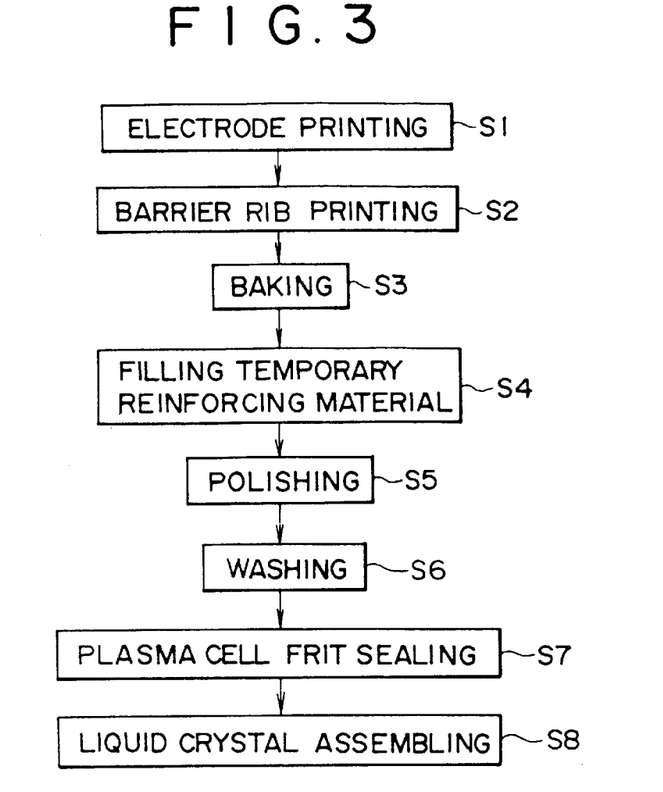
FIG. 3 is a flow chart illustrating an exemplary embodiment for the method of manufacturing a plasma addressed liquid crystal display device according to the present invention.

Referring again to the flow chart of FIG. 3, the temporary reinforcing material is filled at step S4. In this embodiment, a water soluble UV-ray curable resin (3046B) manufactured by Three Bond Co. is used and spray-coated in an atomized state. Subsequently, UV rays are irradiated for curing the reinforcing material. By repeating the coating and the irradiation steps for several times, the temporary reinforcing material is filled to a level at a height of 160 to 170 μm to bury the periphery of the individual barrier ribs. FIG. 4 schematically shows a relationship between the height of the barrier rib 3 and the level for the height of the temporary reinforcing material 4.

The UV-ray curable resin may be coated by a dipping method instead of the spray method. Upon dipping, it is preferred to select the pulling-up direction from the reservoir of material into which the substrate is dipped as a direction perpendicular to the stripes of the partition walls. If the substrate is pulled up from the reservoir in a direction parallel with the stripes, uneven thickness is caused between upper and lower portions.

Then, polishing is performed at step S5. In this embodiment, the polishing treatment was applied by using a single-side polishing machine for use in liquid crystal display device glass substrates (for example, SP-800 manufactured by Speedfan Co.). FIG. 5 shows a perspective outer-looking structure of the single-side polishing machine. A pair of arms 22 and 22 are attached on the upper surface of a rotary grinding stone plate 21. A pressing plate 23 is attached to the lower surface of each arm 22. A substrate 2 as an object for polishing is secured to the rear face of the pressing plate 23.

Figure 5:
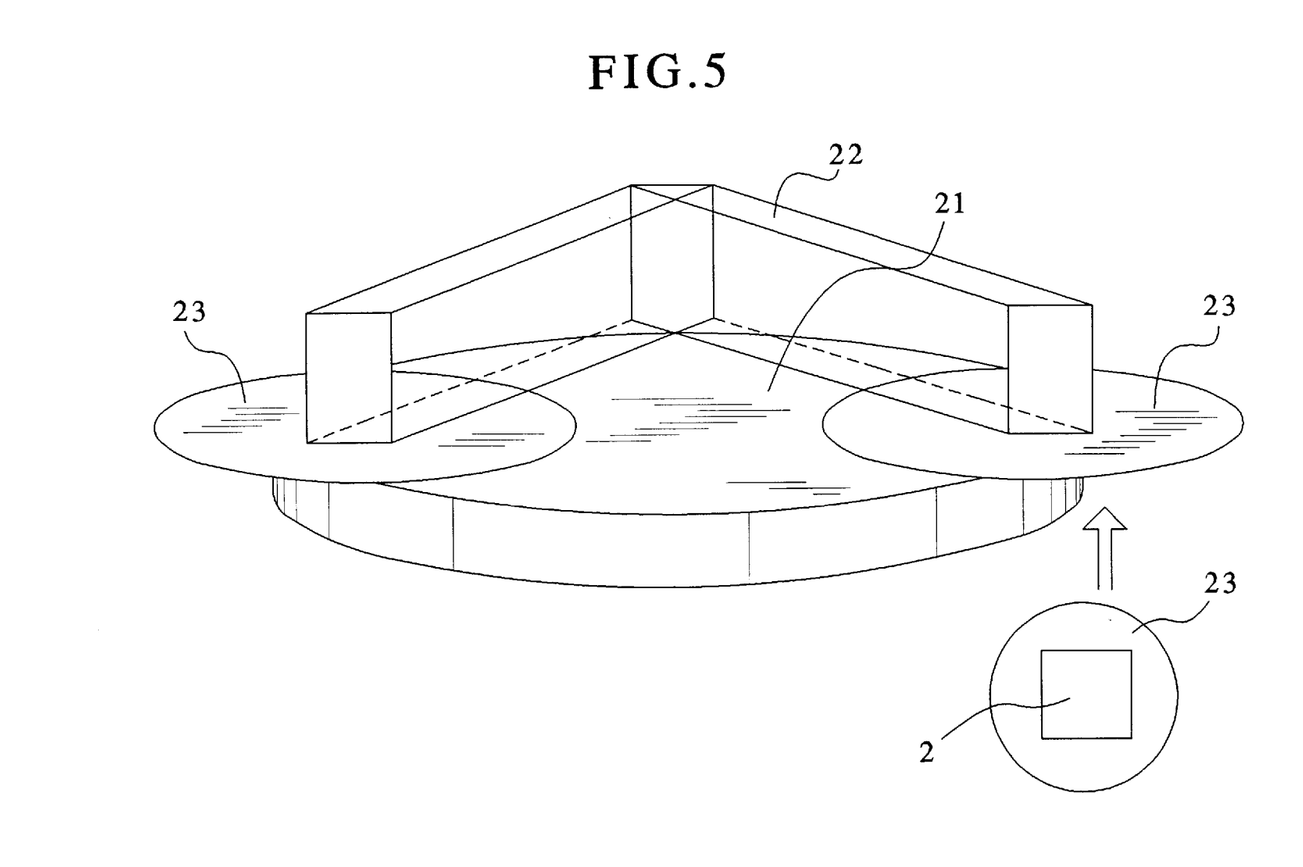
FIG. 5 is a perspective outerlooking view of a single-side polishing machine used for a polishing treatment.
Figure 6:
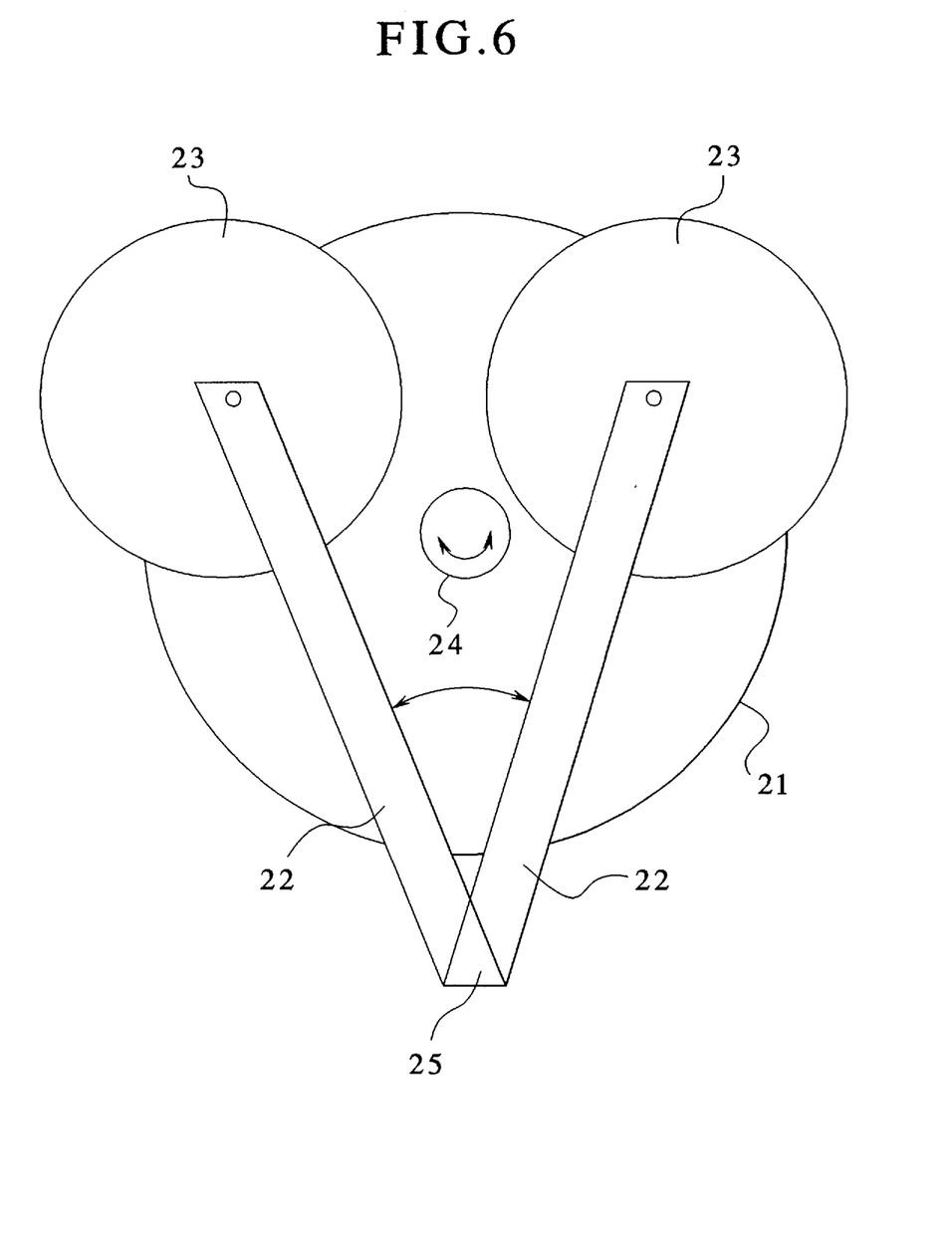
FIG. 6 is a plan view for the single-side polishing machine.

FIG. 6 is a schematic plan view illustrating the polishing operation of the single-side polishing machine shown in FIG. 5. As shown in the figure, the rotary grinding stone plate 21 rotates in both directions around a shaft 24. On the other hand, a pair of arms 22 swing rotatably in the direction in parallel with the rotary grinding stone plate 22. As a result, the top portion of the partition walls disposed on the substrate 2 secured at the rear face of the pressing plate 23 can be polished uniformly. In this embodiment, WA #2000 is used as the polishing member, a pressure of 0.3 kgf is applied to the pressing plate 23, the number of rotations of the rotary grinding stone plate 21 is set to 25 rpm, and the cycle of the swinging movement of the pair of arms is set to 4 rpm. Grinding for the top portion of the barrier rib by about 20 μm can be conducted by applying the polishing treatment for 10 to 15 sec.

Referring again to the flow chart of FIG. 3, the UV-ray curable resin is washed at step S6. Washing is conducted by using a warm water at 80° C. and applying supersonic waves and a swinging movement. The UV-ray curable resin can be peeled off substantially completely by the washing treatment for about 15 min. Subsequently, the washing solution is replaced from warm water to IPA to remove unevenness in drying. Subsequently, frit sealing is conducted at step S7 to join the substrate after polishing to the dielectric sheet and an ionizable gas is sealed inside the gap therebetween to form a plasma cell. Finally, a liquid crystal cell is assembled on the upper surface of the dielectric sheet to complete the plasma addressed liquid crystal display device.

Figure 8:
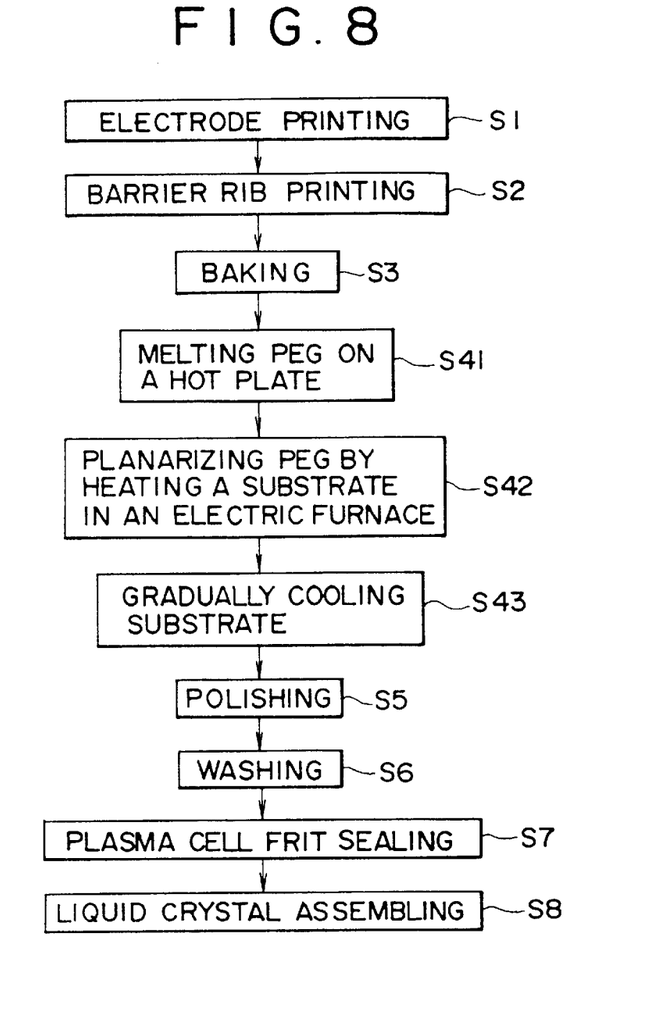
FIG. 8 is a flow chart illustrating another embodiment for a method of manufacturing a plasma addressed liquid crystal display device according to the present invention.

FIG. 8 is a flow chart illustrating another embodiment of manufacturing a plasma addressed liquid crystal display device according to the present invention. This is basically identical with the previous embodiment shown in FIG. 3, except for using water soluble polyethylene glycol instead of the water soluble UV-ray curable resin as the temporary reinforcing material. The material is thermoplastic. At first, printing for plasma electrodes is conducted at step S1. Then, barrier ribs are printed at step S2. Then, the printed plasma electrodes and the barrier ribs are simultaneously baked at step S3. Subsequently, the temporary reinforcing material is filled at steps S41, S42 and S43. In this case, water soluble polyethylene glycol (PEG) is provided as the temporary reinforcing material. For instance, PEG 1540 (a trade name of products manufactured by Daiichi Kogyo Seiyaku Co.) can be used. Alternatively, CARBO WAX 1450 (a trade name of products supplied from Carbide Chemicals and Plastics Co.) can be used. Both of the materials are thermoplastic having a melting temperature at 45° C. to 50° C. and are completely water soluble. At first, polyethylene glycol is supplied to the substrate to which the plasma electrodes and the barrier ribs are previously formed at step 41. The substrate is placed on a hot plate, and the supplied polyethylene glycol is melted.

Successively, proceeding to step S42, the substrate is heated by way of an electric path to planarize the surface of polyethylene glycol. By heating the substrate under the condition that a temperature is higher by about 5° C. than the melting point of polyethylene glycol, the surface of polyethylene glycol reaches a molten state and is planarized under the effect of surface tension. Then, the substrate is gradually cooled at step S43. If the substrate is cooled rapidly, there may be a problem of cracking in the surface upon solidification of polyethylene glycol. Thus, when the step of filling the temporary reinforcing material has been completed, the process proceeds to step S5 and polishing treatment is applied. Then, the water soluble polyethylene glycol is washed away at step S6. Subsequently, frit sealing is applied in step S7 to join the substrate with the dielectric sheet, and an ionizable gas is sealed at the inside to assemble a plasma cell. Finally, a liquid crystal cell is assembled on the upper surface of the dielectric sheet to complete a plasma addressed liquid crystal display device at step S8.

Figure 9:
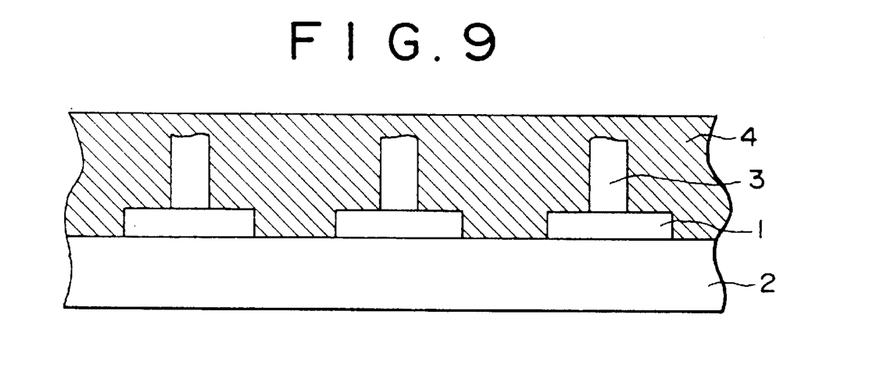
FIG. 9 is a schematic cross sectional view illustrating a state of filling a temporary reinforcing material.

FIG. 9 is a schematic fragmentary cross sectional view illustrating the state of filling of the temporary reinforcing material 4 comprising polyethylene glycol. In this embodiment, polyethylene glycol is coated to a considerable thickness so as to entirely cover the barrier rib 3. As described previously, since the surface of the reinforcing material 4 comprising polyethylene glycol is planarized, a uniform and reliable polishing treatment can be performed. Further, since polyethylene glycol is completely water soluble, it can be removed substantially completely only by the addition of water. Accordingly, no undesired effects are given on the plasma discharge. Different from the case of using the UV-ray curable resin, no special devices such as UV lamps are necessary. Polyethylene glycol itself is chemically stable.

In the two embodiments described previously, the water soluble UV-ray curable resin or the thermoplastic resin such as polyethylene glycol is used as the temporary reinforcing material. An optimum temporary reinforcing material may be selected in accordance with individual manufacturing conditions and the present invention is not restricted only to the disclosed resin materials. In a case of using the UV-ray curable resin, it should be noted that the peeling amount of the temporary reinforcing material is different depending on the viscosity. If the viscosity is relatively high, the temporary reinforcing material is not dissolved in water but rather tends to be peeled off by water. Therefore, the resin may not effectively function as a reinforcing material during polishing. Further, if its viscosity is relatively low, the resin peeled off with the water may remain solid and have embedded therein the abrasive used in polishing which may possibly damage the barrier ribs. In the case of using polyethylene glycol, it is free from such drawbacks.

As has been described above, according to the present invention, the top portion of the barrier ribs is polished by filling the temporary reinforcing material such as a UV-ray curable resin or polyethylene glycol around the ribs to thereby enhance the rib strength during polishing, and barrier ribs of uniform height can be prepared at a good yield by subsequently removing the temporary reinforcing material. The finishing accuracy of the polishing step (the flatness) can be improved and the unevenness in the gap after bonding with the liquid crystal cell can be uniformly controlled to less than 0.1 μm.

Another embodiment of the invention is described specifically by way of examples with reference to the drawings. FIGS. 10*a*–10*g* is a series of drawings showing the steps for explaining the polishing of barrier ribs in the manufacturing process for a plasma addressed display device according to the present embodiment.

Figure 10A:
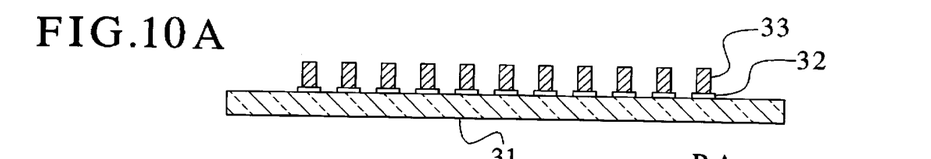
FIGS. 10a–10g show cross sectional views illustrating another embodiment of a method for manufacturing a display according to the principles of the present invention.

At first, as shown in FIG. 10*a,* stripe-like plasma electrodes 32 are formed, for example, by a screen printing method on a plasma substrate glass 31 and then barrier ribs 33 are formed at a pitch equal with that of the plasma electrodes, for example, by a screen printing method juxtaposed with the plasma electrodes to form barrier ribs 5 before polishing. In this case, the barrier ribs may be spaced apart not in contact with the plasma electrodes or, alternatively, the barrier ribs may be formed not on the plasma substrate glass 31 as illustrated but on the dielectric sheet 4.

Figure 10B:
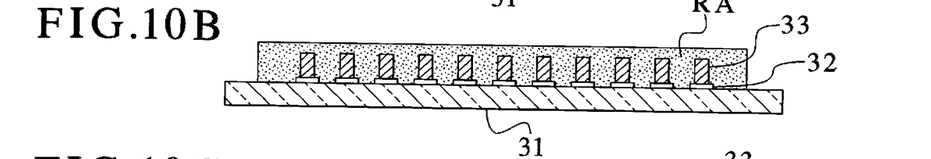

Then, as shown in FIG. 10*b,* a reinforcing material RA is applied to the substrate 31 so as to fill the gap between the barrier ribs 33' and also fill above the top end faces of the barrier ribs.

Since the surface of the reinforcing material RA is raised from the tops of the barrier ribs 33, the reinforcing material RA is polished first and then the barrier ribs are polished simultaneously with the reinforcing material, so that damaging of the barrier ribs can be prevented.

As the reinforcing material RA, a water soluble material is preferred and can be a material sold under the trade name, CARBO-WAX 1450 (manufactured by Union Carbide Chemicals and Plastics Co.). It is of course possible to use an oil soluble material as well, but a water soluble reinforcing material comprising polyethylene glycol as a main ingredient is preferred considering the subsequent use of the electrodes and, further, ease of removal after polishing. As a method of filling the reinforcing material RA, it is preferred to use a method of coating a reinforcing material RA as a solid wax between the barrier ribs 33 and then heating the same with a hot plate or the like thereby liquefying and flattening the reinforcing material. It may suffice that the height of the wax is flush with the tops of the barrier ribs or it may be above the top end faces of the barrier ribs.

After filling the reinforcing material RA on the substrate, the barrier ribs are polished. In accordance with the present embodiment, polishing is conducted by using a polishing liquid by which the reinforcing material RA is relatively insoluble. When a water soluble reinforcing material RA is used, the solvent, or liquid, which is used for the liquid polisher is an oil-based solvent, such as, refined oil, vegetable oil, ether, benzine and ester, for example, but the invention is not restricted only thereto. If an oil soluble reinforcing material RA is used, on the other hand, a liquid polisher having a water-based solvent, or liquid, can be used, such as water. As the abrasive component of the liquid polisher, cerium hydroxide can be used.

Figure 10C:
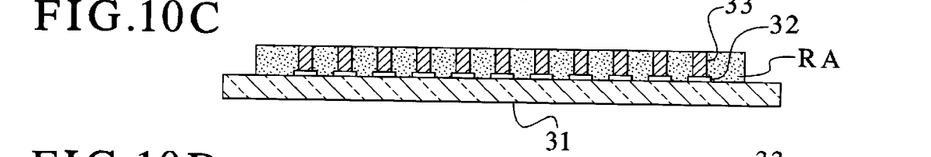
Figure 10D:
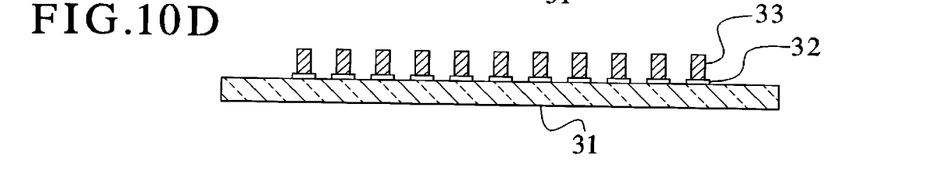

When the liquid polisher that does not dissolve the reinforcing material RA, as described above, is used, the reinforcing material RA is not dissolved during the polishing step but instead is polished together with the barrier ribs 33 as shown in FIG. 10c, so that the barrier ribs can be effectively prevented from breakage during polishing. The polishing method which can be adopted, for example, is a method of fixing an object (the substrate with the ribs and reinforcing material) to be polished on a surface table and polishing the object by rotating and swinging grinding stone plates while rotating the surface table by using, for example, a polishing machine. During and at the completion of the polishing step, the exposed surface of the reinforcing material RA and the top end surfaces of the barrier ribs are flush with each other as shown in FIG. 10c.

Finally, the reinforcing material RA is removed by being flushed out in a washing step. As the washing liquid, cold or warm water can be used in a case of using a reinforcing material comprising polyethylene glycol as the main ingredient. An oil is used to remove the oil-soluble reinforcing material, when such reinforcing material is used instead.

In accordance with such polishing method described above, since the reinforcing material RA fills the gap between the barrier ribs to the end of the polishing step, there is no need to worry that the liquid polisher will contaminate the substrate glass and there is no need to worry about undesired effects on the transmittance caused by the residue of the liquid polisher. In addition, if a long time polishing is intended, polishing may be conducted as it is and, further, if the type of the liquid polisher is intended to be changed, it can be coped with in the same manner.

Figure 10E:
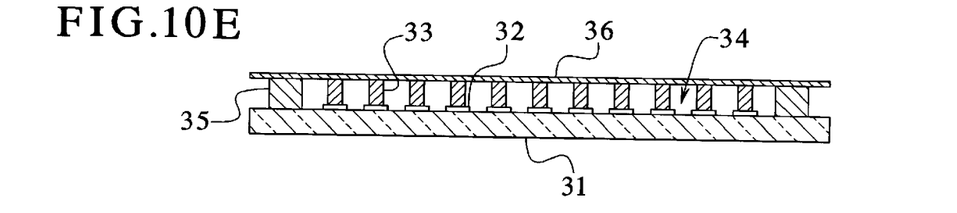

Then, as shown in FIG. 10e, a frit seal 35 is formed, for example, by a dispenser at the periphery of the plasma substrate glass 31, a dielectric sheet 36 made of glass is joined to the plasma substrate glass by way of the frit seal 35 while placing the sheet 36 on the barrier ribs, and a gas is injected to the thus formed plasma chamber 34.

Figure 10F:
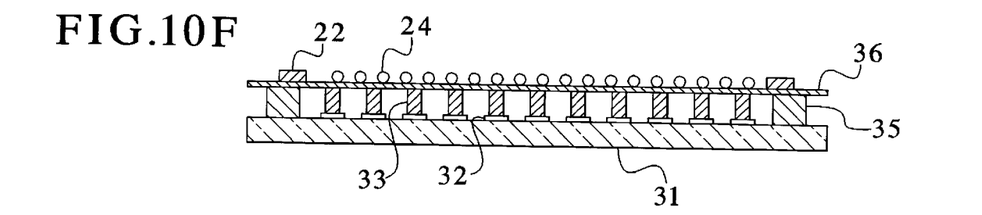
Figure 10G:
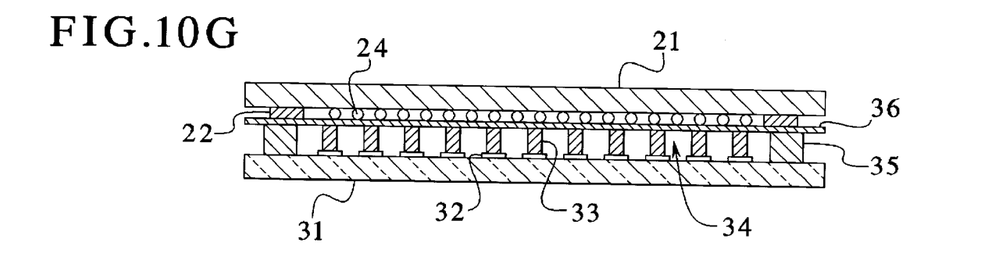

Then, orientation treatment (which is not illustrated here) is applied and, as shown in FIG. 10f, spacers 24 are scattered for making the thickness of the liquid crystal layer uniform, a color filter 21 is joined to the dielectric sheet 36 by way of a liquid crystal seal material 22 to the dielectric sheet 4 to form a liquid crystal chamber and then the liquid crystal is injected to obtain a plasma display device shown in FIG. 2.

In accordance with the present embodiment, since the reinforcing material for the barrier ribs can provide the function as shown, barrier ribs can be prevented from breaking or otherwise being damaged. Further, since the polishing material does not intrude into the spaces between the barrier ribs, the problem of the residue of the polishing material remaining in these spaces does not occur. Further, this development can cope also with long polishing time or with polishing while changing the type of the liquid polisher.

Since the reinforcing material is thus caused to remain, it is preferred that the reinforcing material is substantially insoluble in the liquid polish and it is preferred to use an oil-based liquid polish when a water soluble reinforcing material is used.

Further, since the reinforcing material or filling material is filled so as to bury the barrier ribs, the reinforcing material is polished first, which results in a greater reinforcing effect of the reinforcing material on the barrier ribs.

Figure 11A:
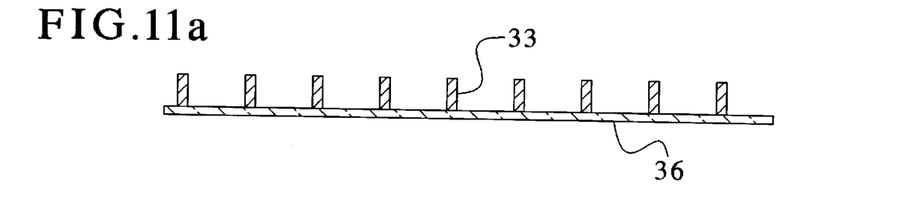
FIGS. 11a–11f show cross sectional views illustrating yet a further embodiment of the method for manufacturing a display of the present invention.
Figure 11B:
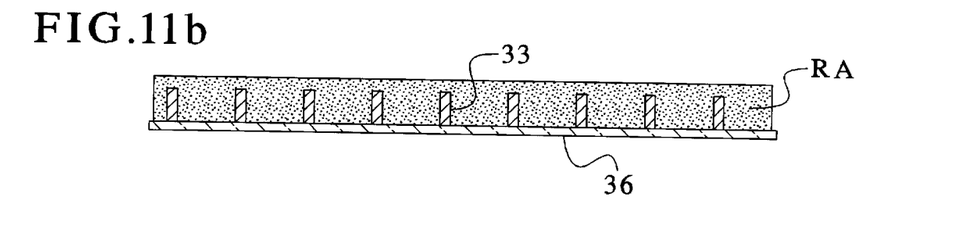

Another embodiment is shown in FIGS. 11a–11f wherein the barrier ribs 33 are formed on the dielectric layer 36, as shown in FIG. 11a. The free edges of the ribs 33 (the top edges of the ribs in the Figure) may be uneven due to the printing steps that form the ribs 33. As shown in FIG. 11b, a reinforcing material layer RA is applied over the ribs 33 to completely cover the ribs. The reinforcing material layer RA is applied to a greater depth than the rib height.

Figure 11C:
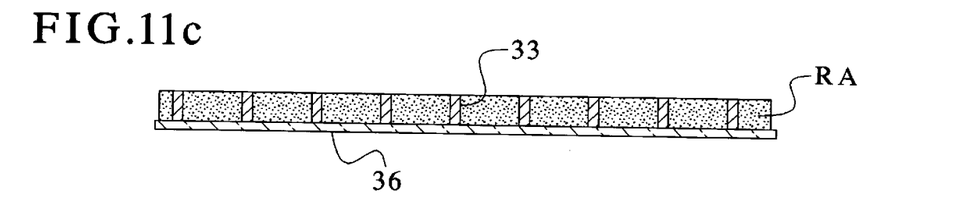
Figure 11D:
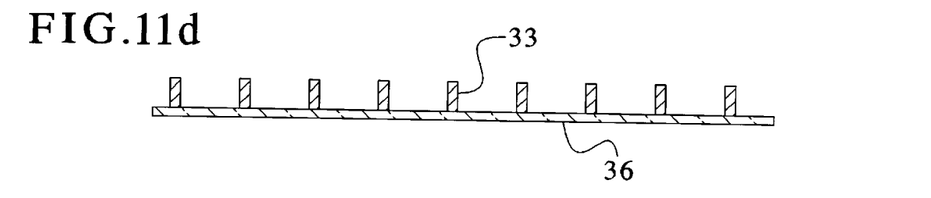
Figure 11E:
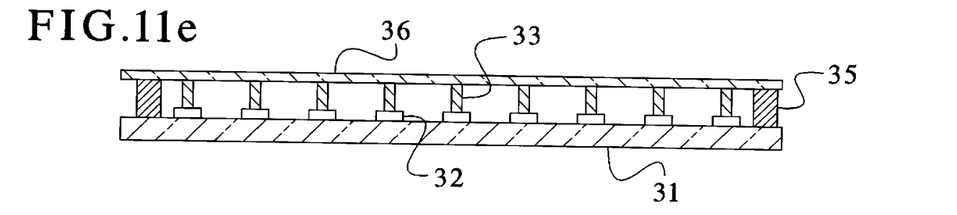

The results of a polishing step is shown in FIG. 11c, wherein the top of the reinforcing material layer RA is polished, or eroded, to define a planar surface. The polishing step is performed until the ribs 33 are exposed and polished in the plane of the reinforcing material RA layer. The reinforcing material RA is removed, as shown in FIG. 11d, so that the dielectric layer 36 with the ribs 33, that are now all of the same height, are projecting from the surface of the dielectric layer 36.

The dielectric layer 36 with the ribs 33 is then inverted and placed on a substrate 31 that has discharge electrodes 32 previously formed thereon. It is, of course, not necessary that the dielectric layer 36 be inverted in the manufacturing steps, since the substrate 31 with the discharge electrodes 32 may be inverted relative to the illustration in FIG. 11e before affixing the dielectric layer 36 and the substrate 31 to one another. The dielectric layer 36 and the substrate 31 are positioned so that the discharge electrodes 32 and the ribs 33 are parallel and so that the ribs 33 are atop the discharge electrodes 32. The ribs 33 and discharge electrodes 32 divide the space between the dielectric layer 36 and the substrate 31 into a plurality of parallel elongated discharge chambers, which extend into the page in FIG. 11e. The edges of the dielectric sheet 36 and the substrate 31 are sealed by a frit seal 35 and a discharge gas is injected thereinto.

Figure 11F:
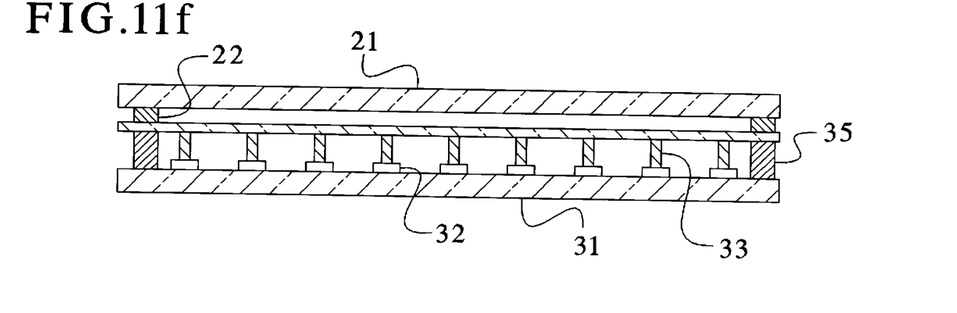

In FIG. 11f is shown the assembled dielectric layer 36 and the substrate 31 to which has been added a top substrate. The top substrate is spaced from the dielectric layer 36 by a gap that is filled with opto-electric material such as liquid crystal material. The edges of the gap are sealed with a seal.

Although other modifications and changes may be suggested by those skilled in the art, it is the intention of the inventors to embody within the patent warranted hereon all changes and modifications as reasonably and properly come within the scope of their contribution to the art.

We claim:

1. A method for manufacturing a plasma addressed liquid crystal display device having a plasma cell and a liquid crystal cell, comprising the steps of:

providing a substrate having a plurality of plasma electrodes on a major surface;

forming stripe-shaped barrier ribs on said major surface of said substrate;

filling a temporary reinforcing material on said major surface between each of said stripe-shaped barrier ribs at least until a top surface of said temporary reinforcing material is level with top surfaces of said stripe-shaped barrier ribs;

polishing top surfaces of said stripe-shaped barrier ribs to planarize said top surfaces of said stripe-shaped barrier ribs while also polishing top surfaces of said temporary reinforcing material, said polishing step using a liquid;

removing said temporary reinforcing material to expose said plasma electrodes; and joining a dielectric sheet in contact with top portions of said stripe-shaped barrier ribs to form a plasma cell.

2. A method as claimed in claim 1, wherein said temporary reinforcing material filled in said filling step is substantially insoluble in water, and said liquid used in said polishing step is water.

3. A method as claimed in claim 1, wherein said temporary reinforcing material filled in said filling step is substantially insoluble in oil, and said liquid used in said polishing step is oil.

4. A method as claimed in claim 1, wherein said temporary reinforcing material in said filling step consists essentially of polyethylene glycol.

5. A method for manufacturing a plasma addressed liquid crystal display device having a plasma cell and a liquid crystal cell, comprising the steps of:

providing a dielectric sheet having a major surface;

forming stripe-shaped barrier ribs on said major surface of said dielectric sheet;

filling a temporary reinforcing material on said major surface between each of said stripe-shaped barrier ribs at least until a top surface of said temporary reinforcing material is level with top surfaces of said stripe-shaped barrier ribs;

polishing top surfaces of said stripe-shaped barrier ribs to planarize said top surfaces of said stripe-shaped barrier ribs while also polishing top surfaces of said temporary reinforcing material, said polishing step using a liquid;

removing said temporary reinforcing material from between said stripe-shaped barrier ribs; and joining a substrate having a plurality of plasma electrodes in contact with top portions of said stripe-shaped barrier ribs to form a plasma cell.

6. A method as claimed in claim 5, wherein said temporary reinforcing material filled in said filling step is substantially insoluble in water, and said liquid used in said polishing step is water.

7. A method as claimed in claim 5, wherein said temporary reinforcing material filled in said filling step is substantially insoluble in oil, and said liquid used in said polishing step is oil.

8. A method as claimed in claim 5, wherein said temporary reinforcing material in said filling step consists essentially of polyethylene glycol.

9. A method for producing a discharge display panel, comprising the steps of:

providing a dielectric sheet;

forming barrier ribs in parallel on a major surface of said dielectric sheet;

filling spaces between said barrier ribs with a reinforcing material;

polishing said reinforcing material and said barrier ribs to form a substantially planar surface;

removing said reinforcing material from between said barrier ribs;

providing a substrate with parallel discharge electrodes;

joining said substrate with said dielectric sheet so that barrier ribs define a height of a discharge space between said dielectric sheet and said substrate.

10. A method as claimed in claim 9, wherein said joining step joins said dielectric sheet to said substrate so that said barrier ribs are disposed on said discharge electrodes.

11. A method as claimed in claim 9, wherein said substrate is a first substrate and further comprising the steps of:

joining a second substrate to said dielectric sheet on a side opposite said first substrate spaced from said dielectric sheet by a gap; and filling said gap with an electro-optic material.

* * * * *